United States Patent
Lin

(10) Patent No.: US 6,529,145 B1
(45) Date of Patent: *Mar. 4, 2003

(54) KEYBOARD WITH INTERCHANGEABLE CONNECTION FUNCTION AND HOT KEYS

(75) Inventor: Hsien Ming Lin, Taipei (TW)

(73) Assignee: Silitek Corporation, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/464,478

(22) Filed: Dec. 16, 1999

(51) Int. Cl.[7] ............................................. H03K 17/967
(52) U.S. Cl. ......................... 341/22; 379/368; 708/142
(58) Field of Search .......................... 341/176, 22, 23, 341/26; 379/368; 400/46, 45; 708/142, 145

(56) References Cited

U.S. PATENT DOCUMENTS 5,527,122 A * 6/1996 Carter ........................ 400/496
5,986,586 A * 11/1999 Tsai ............................ 341/22
6,373,471 B1 * 4/2002 Lin ............................ 341/140

* cited by examiner

Primary Examiner—Michael Horabik
Assistant Examiner—Hung Dang
(74) Attorney, Agent, or Firm—Birch, Stewart, Kolasch & Birch, LLP

(57) ABSTRACT

A keyboard with interchangeable connection specification, comprises an input/output circuit board for DIN, PS/2 or USB connection specification and replaceably assembled within a main body of the keyboard. The input/output circuit board has signal transmitting end connected to the signal receiving end of a membrane circuit of the keyboard. The keyboard further comprises an openable cover on a panel of the main body of said keyboard and corresponding to the location of the input/output circuit board. The openable cover is opened to replace the input/output circuit board mounted within the keyboard for required connection specification. The keyboard further comprises a plurality of hot keys on the keyboard and at location corresponding to the openable cover. Each said hot key has a key top, a rubber dome and associated internal circuit.

10 Claims, 4 Drawing Sheets

US 6,529,145 B1

KEYBOARD WITH INTERCHANGEABLE CONNECTION FUNCTION AND HOT KEYS

FIELD OF THE INVENTION

The present invention relates to a keyboard, especially to a keyboard with interchangeable connection function, which can be compatible with PS/2 keyboard or USB keyboard and has produce flexibility.

BACKGROUND OF THE INVENTION

The conventional keyboard generally has a built-in processor connected to the CPU of the computer through USB (universal serial bus) connector or PS/2 connector. Moreover, the built-in processor of the wireless keyboard communicates the CPU of the computer through IR (infrared) or RF (radio frequency) module. However, the processor of all keyboards are built in therein, the stock of spare parts is serious problem when large amount and various kind of keyboards (PS/2, IR, RF) are to be produced. Moreover, the advanced keyboards are demanded to provide with hot keys. However, the hot keys and the other ordinary keys are manufactured with different mold, therefore, the cost is high.

It is an object of the present invention to provide a keyboard with interchangeable connection function, wherein the connection specification of the keyboard can be changed by replacing an I/O circuit board assembled therein. Therefore, the stock amount of keyboard main body can be reduced.

It is another object of the present invention to provide a keyboard with interchangeable connection function, wherein hot keys are easily assembled and can be enabled or disabled according to user's need.

To achieve the above object, the present invention provides a keyboard with interchangeable connection specification, comprises an input/output circuit board for DIN, PS/2 or USB connection specification and replaceably assembled within a main body of the keyboard. The input/output circuit board has signal transmitting end connected to the signal receiving end of a membrane circuit of the keyboard. The keyboard further comprises an openable cover on a panel of the main body of said keyboard and corresponding to the location of the input/output circuit board. The openable cover is opened to replace the input/output circuit board mounted within the keyboard for required connection specification. The keyboard further comprises a plurality of hot keys on the keyboard and at location corresponding to the openable cover. Each said hot key has a key top, a rubber dome and associated internal circuit.

The various objects and advantages of the present invention will be more readily understood from the following detailed description when read in conjunction with the appended drawing, in which:

DETAILED DESCRIPTION OF THE PREFERRED EMBODIMENT

Figure 1:
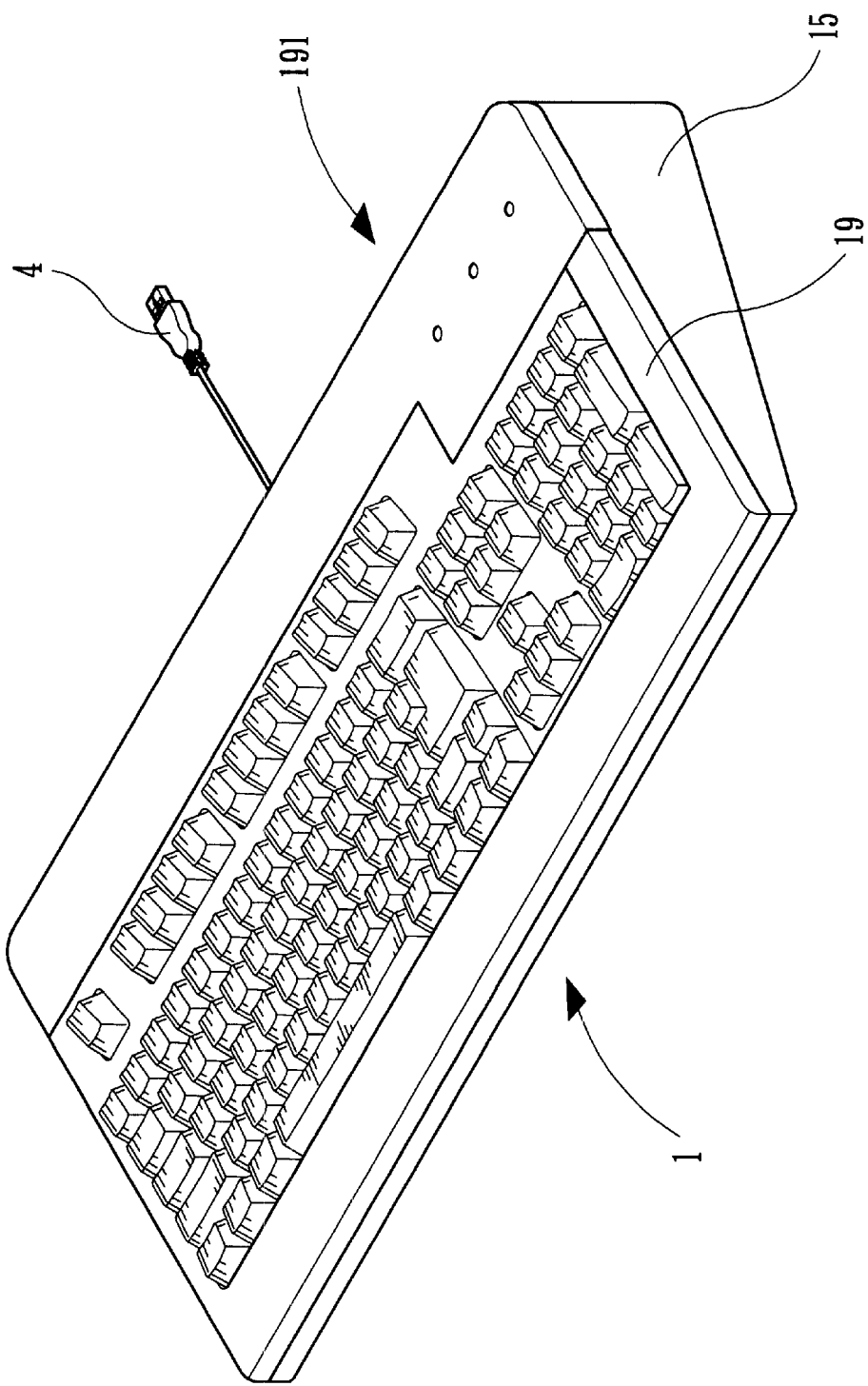
FIG. 1 is the perspective view of the first embodiment of the present invention.

As shown in FIGS. 1 to 4, the present invention provides a keyboard 1 with interchangeable function and is demonstrated with four preferred embodiments. The first to third preferred embodiments relate to wired keyboards and the fourth preferred embodiment relates to a wireless keyboard. More particularly, the first preferred embodiment relates to a keyboard with hot keys sealed by a panel. The second and third preferred embodiments relate to keyboard with hot keys sealed by an openable panel.

The I/O circuit board 10 of the keyboard 1 has a wired or wireless signal transmitting circuit of DIN specification (connection line 2), PS/2 specification (connection line 3) or USB specification (connection line 4). The I/O circuit board 10 of the keyboard 1 is assembled within the keyboard 1 by locking and has a gold-finger portion 11 connected to the gold-finger portion 17 on the membrane circuit 12 of the keyboard 1. Moreover, the I/O circuit board 10 is secured to the keyboard 1 by locking two screws 13, through two through holes 18 of the I/O circuit board 10, two through holes on the membrane circuit 12 and two through holes on the plate 14, on two threaded poles 16 on the bottom plate 15 of the keyboard 1. Moreover, the keyboard 1 is provided with a circuit means 56 for USB specification on a location opposite to the I/O circuit board 10.

The I/O circuit board 10 of the keyboard 1 can be easily replaced according to the required connection specification (DIN, PS/2 or USB). The spare amount for the main body of keyboard can be advantageously reduced and the stock problem can be alleviated.

Figure 2:
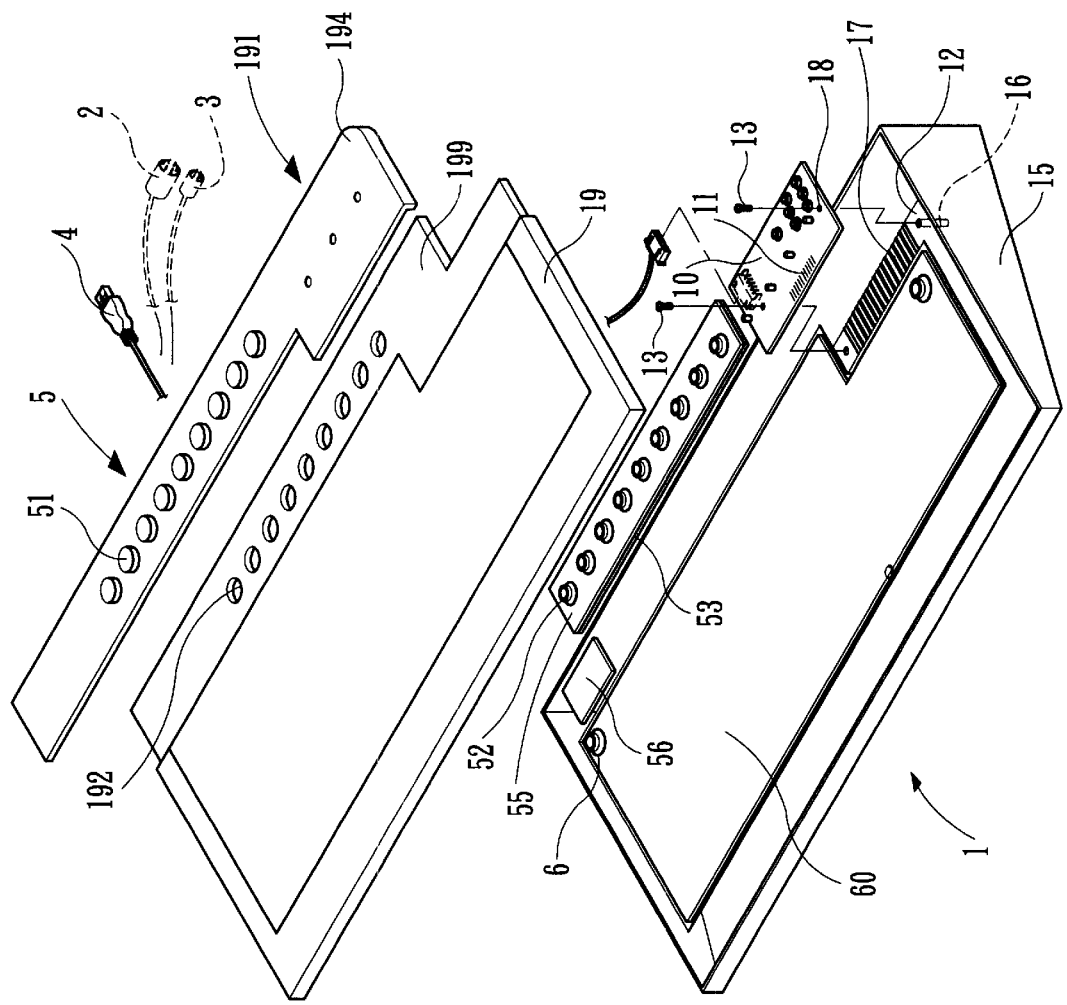
FIG. 2 is the exploded view of the second embodiment of the present invention.
Figure 3:
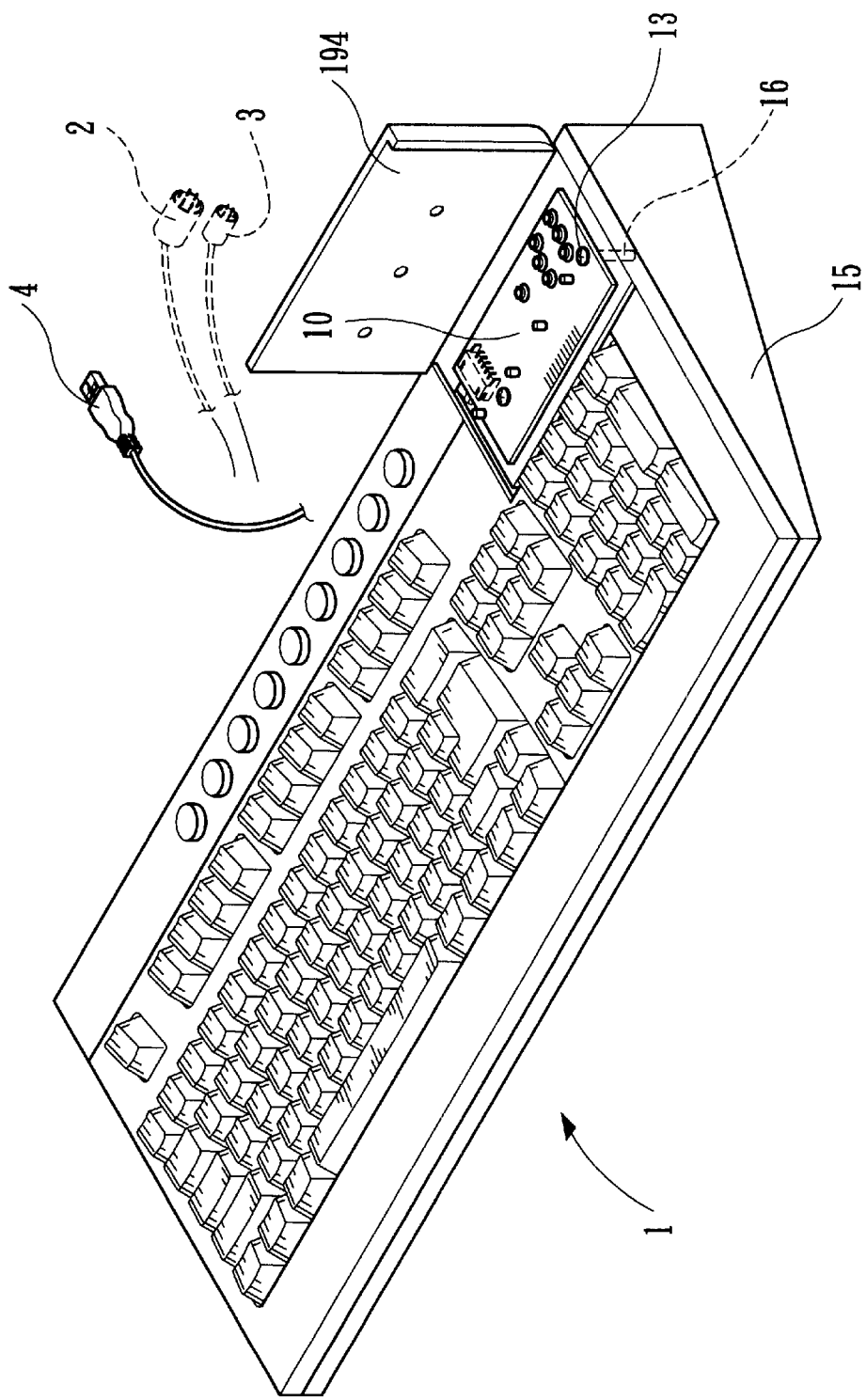
FIG. 3 is the perspective view of the third embodiment of the present invention.
Figure 4:
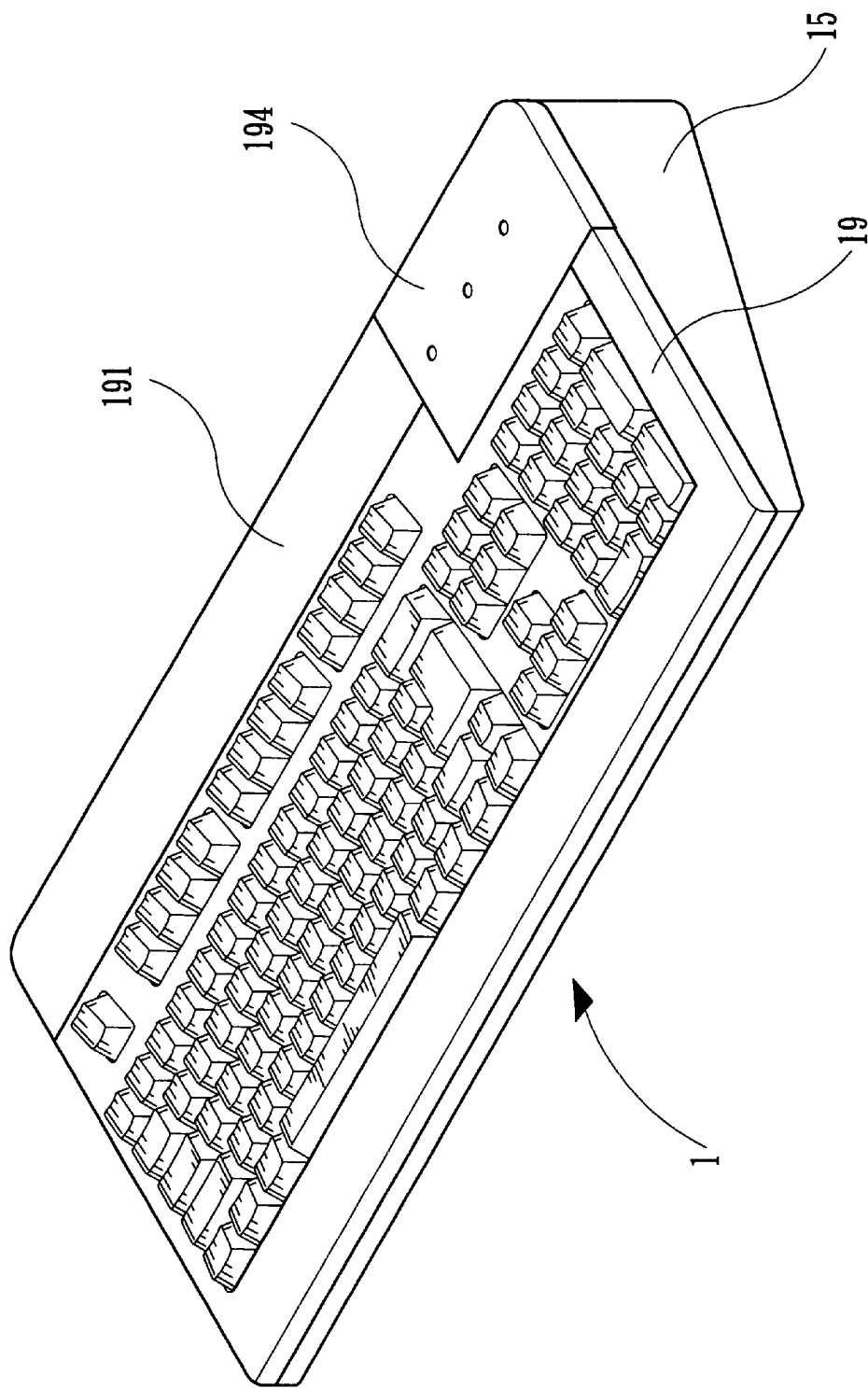
FIG. 4 is the perspective view of the fourth embodiment of the present invention.

The panel 19 of the keyboard main body corresponding to the I/O circuit board 10 has a blank area 199 equipped with an detachable cover 191 to facilitate the replacement of the I/O circuit board 10, as shown in FIGS. 2 and 3. As shown in FIG. 2, the detachable cover 191 has a retaining plate to retain the detachable cover 191 to the main body of keyboard beside the blank area 199. Moreover, in another preferred embodiment shown in FIG. 3, the detachable cover 191 has an openable lid 194 arranged on one side thereof. By opening the openable lid 194, the I/O circuit board 10 of another connection specification can be easily assembled. Moreover, the present keyboards are often provided with hot keys 5 which are placed on top side of function keys or the numerical keypad of the 104 enhanced Windows keyboard. In the present invention, the hot keys 5 are placed on top of function keys and each comprises a keytop 51 and a resilient means 52, which is exemplified with rubber dome 52 in the preferred embodiment, and associated internal circuit. The rubber dome 52 passes through the through hole 192 on the panel 19 and is connected with the keytop 51 passing through the through hole of the detachable cover 191. The rubber dome 52 can be integrally formed with the rubber plate 60 mounting the rubber dome 6 of ordinary keys, or can be individually formed as a single rubber strip 55. The single rubber strip 55 is provided with membrane circuit board or conventional circuit board. Moreover, a strip-shaped plate 53 is provided below the single rubber strip 55. Therefore, the hot keys 5 can be selected to enable or not according to user's need. More particularly, in the present invention, the hot keys 5 are originally arranged within the keyboard and can be disabled by shielding the detachable cover 191 thereon, as shown in FIG. 1. FIGS. 2 and 3 show the cases wherein the hot keys 5 are designed to be accessible to user. In both cases, the hot keys 5 can be easily assembled and replaced. However, the mounting manner of the detachable cover 191 and the case 1 are not restricted in the present invention.

With the present invention, the keyboard manufacturers do not need to stock lots amount of keyboard main body of various connection specifications or with/without hot keys. They can store keyboard main body of same specification and I/O circuit board 10 of various connection specifications. They only need to assemble the I/O circuit board 10 of required connection specification to the keyboard main body for a specific order. Moreover, to the consumer end, they can easily change their keyboard to another connection specification by changing I/O circuit board 10 of required connection specification and associated connection 20 line.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A keyboard with interchangeable connection specification and hot keys comprising:

an input/output circuit board for DIN, PS/2 or USB connection specification; said input/output circuit board replaceably assembled within a main body of said keyboard and having signal transmitting end connected to the signal receiving end of a membrane circuit of said keyboard;

an openable cover on a panel of said main body of said keyboard and corresponding to the location of said input/output circuit board;

a plurality of hot keys arranged on position corresponding to said openable cover and each having a key top, a rubber dome and associated internal circuit connected to said input/output circuit board;

wherein said openable cover is opened to replace said input/output circuit board mounted within said keyboard for required connection specification.

2. The keyboard with interchangeable connection specification and hot keys as in claim 1, wherein said connection specification is wired connection.

3. The keyboard with interchangeable connection specification and hot keys as in claim 1, wherein said connection specification is wireless connection.

4. The keyboard with interchangeable connection specification and hot keys as in claim 1, wherein said openable cover is such configured that said key top of said hot keys exposes out of said openable cover.

5. The keyboard with interchangeable connection specification and hot keys as in claim 1, wherein said openable cover is such configured that said openable cover shields said rubber dome of said hot keys.

6. A keyboard with interchangeable connection specification and hot keys, comprising an openable cover on the case of said keyboard, a plurality of hot keys on said keyboard and at location corresponding to said openable cover; each said hot key having a key top, a rubber dome and being connected to an associated internal circuit.

7. The keyboard with interchangeable connection specification and hot keys as in claim 6, wherein said connection specification is wired connection.

8. The keyboard with interchangeable connection specification and hot keys as in claim 6, wherein said connection specification is wireless connection.

9. The keyboard with interchangeable connection specification and hot keys as in claim 6, wherein said openable cover is such configured that said key top of said hot keys exposes out of said openable cover.

10. The keyboard with interchangeable connection specification and hot keys as in claim 6, wherein said openable cover is such configured that said openable cover shields said rubber dome of said hot keys.

* * * * *